United States Patent [19]
Akagawa et al.

[11] Patent Number: 6,157,615
[45] Date of Patent: Dec. 5, 2000

[54] METHOD FOR CONTROLLING A TEST FOR AN ATM EXCHANGE

[75] Inventors: Tsukasa Akagawa; Akio Matsuura; Yuko Tangiku; Kenichi Akita; Kenji Ogawa; Kengo Tsukushi, all of Nagoya, Japan

[73] Assignee: Fujitsu Limited, Kawasaki, Japan

[21] Appl. No.: 09/035,216

[22] Filed: Mar. 5, 1998

[30] Foreign Application Priority Data

Sep. 2, 1997 [JP] Japan ..................................... 9-236714

[51] Int. Cl.[7] ..................................................... H04L 12/26
[52] U.S. Cl. .......................... 370/241; 370/395; 714/712
[58] Field of Search .................................... 370/229, 241, 370/251, 254, 232, 395; 379/1; 714/712

[56] References Cited

U.S. PATENT DOCUMENTS

| | | | |
|---|---|---|---|
| 5,504,754 | 4/1996 | Grunenfelder | 714/712 |
| 5,675,587 | 10/1997 | Okuyama et al. | 714/712 |
| 5,737,338 | 4/1998 | Eguchi et al. | 714/716 |
| 5,878,063 | 3/1999 | Kawasaki et al. | 714/818 |
| 5,887,000 | 3/1999 | Adashi et al. | 714/712 |

*Primary Examiner*—Hassan Kizou
*Assistant Examiner*—Ahmed Elallam
*Attorney, Agent, or Firm*—Helfgott & Karas, P.C.

[57] ABSTRACT

A method for controlling a test for an ATM exchange in which a number of test cell generating devices to be activated is limited in association with a load applied to a central processing device so that the test is preformed without occurrence of congestion. The test is performed by using test cells transmitted from a plurality of test cell generating devices provided in the exchange. A load applied to the central processing device is measured, and a number of test cell generating devices to be used is calculated so that the measured load is maintained below a previously set limit value. The test for the exchange is performed by concurrently using the calculated number of test cell generating devices.

8 Claims, 10 Drawing Sheets

METHOD FOR CONTROLLING A TEST FOR AN ATM EXCHANGE

BACKGROUND OF THE INVENTION

1. Field of the Invention

The present invention relates to a method for controlling a test for an exchange and, more particularly, to a method for controlling a test for an exchange in which a folding test is performed within the exchange.

Recently, various requirements are raised for high speed data communication systems such as a LAN interconnection system, a large capacity file transmission system or a high-speed and highly accurate facsimile transmission system. Also, various requirements have been raised for audio and video communication systems such as a video conference system, a video telephone or a cable television system. Additionally, a multimedia communication which is a combination of data, audio information and video information has become popular, and a demand for a broad band ISDN exchange (ATM exchange) which can be applied to various types of those communication systems has increased. Accordingly, a need has increased to maintain normality of such an asynchronous transfer mode (ATM) exchange by a periodic test.

2. Description of the Related Art

In ATM system in which various kinds of data, audio signals and video signals are transmitted, a cell comprising an information field having 48 bytes and a header having 5 bytes is used. An exchange for switching such cells comprises a central processing device for controlling each section and a line control device which includes a line processing section and a switching section. A subscriber cell is transmitted through the exchange along a route which corresponds to a virtual path identifier (VPI) and a virtual channel identifier (VCI) provided in the header of the cell formed in the line processing section and switching section.

In order to check normality of an exchange, a test cell is transmitted through the exchange so as to determine whether or not the test cell normally transmits the exchange. In this method, a test cell generating device should be provided so as to generate the test cell. The test cell generating device is activated by the central processing device. The test cell generated by the test cell generating device is folded at a designated fold point so as to detect whether or not the test cell normally passed through a designated route. A result of the detection is announced to the central processing device. When the test cell normally passes the designated route, it is determined that the designated route is normal. The determination is performed by detecting a cell loss, a cell error and a bit error.

The above-mentioned test must be periodically performed for all routes within the exchange. In this case, a number of routes to be checked within the exchange is an extremely large number. For example, since the switching section has a multi-stage structure and a large number of intersections are present in each stage, the number of routes passing the intersections is increased as the number of stages is increased. Accordingly, it takes a relatively long time to check all routes by such a test in which a test cell is transmitted and folded.

In order to reduce the test time, a testing method has been suggested in which a plurality of routes are concurrently checked. In this testing method, a folding point is designated for a plurality of routes. Then, a plurality of test cell generating devices are activated so as to generate cells for each of the plurality of routes. The test cells are folded at the respective folding points and detected at substantially the same time.

The central processing device of the exchange controls a call connection and disconnection by controlling the line control device. Additionally, the central processing device controls the periodic test for all routes by activating a plurality of test cell generating devices. Accordingly, there are the following problems.

1) When a periodic test is performed by activating a plurality of test cell generating devices while a large load is applied to the central processing device due to origination of many call connections and disconnections, the load to the central processing device is further increased which results in a high possibility of occurrence of congestion.

2) A fixed load is continuously applied to the central processing device during the periodic test. Thus, when many call connections and disconnections are generated, the load applied to the central processing device is increased which may result in an occurrence of congestion.

3) When a periodic test is performed by activating a plurality of test cell generating devices while a large load is applied to the central processing device for a long time due to origination of many call connections and disconnections, the load to the central processing device is further increased which results in an occurrence of congestion. As a result, the periodic test cannot be completed by a programed time and, thereby, the periodic test may be canceled. Thus, it is possible that a periodic test is not performed for an important route and, thus, normality cannot be assured.

SUMMARY OF THE INVENTION

It is a general object of the present invention to provide an improved and useful method for controlling a test for an exchange in which the above-mentioned problems are eliminated.

A more specific object of the present invention is to provide a method for controlling a test for an ATM exchange in which a number of test cell generating devices to be activated is limited in association with a load being applied to a central processing device so that the test is preformed without occurrence of congestion, and also the test for an important route is performed with priority.

In order to achieve the above-mentioned objects, there is provided according to the present invention a method for controlling a test performed on a broad band ISDN exchange including a central processing device, the test being performed by using test cells transmitted from a plurality of test cell generating devices provided in the exchange, the method comprising the steps of:

measuring a load applied to the central processing device;

calculating a number of the test cell generating devices to be used so that the measured load is maintained below a previously set limit value; and performing the test for the exchange by concurrently using the calculated number of the test cell generating devices.

Accordingly, when the load applied to the central processing device is small, the number of test cell generating devices can be increased so that a time needed for the test is reduced. On the other hand, when the load applied to the central processing devices is large, the number of the test cell generating devices can be increased so that congestion does not occur in the central processing device. Thus, the number of test cell generating devices to be used can be increased as many as possible in response to the load applied to the central processing device. Therefore, normality of the exchange can be checked by performing a test periodically or at an arbitrary time with respect to all routes formable in the exchange without deterioration of service quality to subscribers.

The method according to the present invention may further comprise the steps of:

setting a control start load value and a test stop load value as the limit value;

setting the number of test cell generating devices to be used to a maximum number within a range in which the load applied to the central processing device is maintained below the control start load value;

setting the number of test cell generating devices being used to a minimum number when the load applied to the central processing device exceeds the control start load value; and continuing the test with the number of test cell generating devices being set to the minimum number within a range in which the load applied to the central processing device is maintained below the test stop load value.

Additionally, the above-mentioned method may further including the steps of:

stopping the test when the load applied to the central processing device exceeds the test stop load value;

determining whether the load applied to the central processing device has been decreased when a predetermined time has passed after the test was stopped; and resuming the test when it is determined by the determining step that the load applied to the central processing device has been decreased.

Additionally, the method according to the present invention may further comprise the steps of:

setting a test stop load value as the limit value;

stopping the test when the load applied to the central processing device exceeds the test stop load value;

determining whether the load applied to the central processing device has been decreased when a predetermined time has passed after the test was stopped; and resuming the test when it is determined by the determining step that the load applied to the central processing device has been decreased.

Additionally, the method according to the present invention may further comprise the steps of:

setting a control start load value as the limit value;

setting the number of the test cell generating devices to be used to a maximum number;

decreasing the number of the test cell generating devices being used from the maximum number so as to maintain the load applied to the central processing device to be below the control start load value; and temporarily stopping the test when the load applied to the central processing device exceeds the control start load value when the number of test cell generating devices being used is a minimum number.

Additionally, the method according to the present invention may further comprise the steps of:

registering a maximum number and a minimum number of the test cell generating devices used for the test on the exchange;

setting a control start load value and a test stop load value as the limit value; and setting the number of the test cell generating devices to be used to a number within a range between the maximum number and the minimum number by comparing the measured load with both the control start load value and the test stop load value.

Additionally, the method according to the present invention may further comprising the steps of:

setting at least one route of a plurality of routes formable within the exchange as an important route;

setting an important route test execution control mode to the exchange in which one of a priority mode and an exclusive mode is selectable;

performing the test by giving priority to the important route when the priority mode is selected and the load applied to the central processing device exceeds the control start load value; and performing the test only for the important route when the exclusive mode is selected and the load applied to the central processing device exceeds control start load value.

Accordingly, the test can be positively performed on the important route even when the load applied to the central processing device is large. That is, the important route can always be tested which increases reliability of an operation of the exchange.

Additionally, the method according to the present invention may further comprise the steps of:

setting a minimum number of the test cell generating devices to be used;

decreasing the number of the test cell generating devices when the load applied to the central processing device exceeds the limit value;

performing the test by giving priority to the important route when the priority mode is selected and the load applied to the central processing device exceeds the control start load value when the number of the test cell generating devices is set to the minimum number; and performing the test only for the important route when the exclusive mode is selected and the load applied to the central processing device exceeds a control start load value when the number of the test cell generating devices is set to the minimum number.

Accordingly, the test can be positively performed on the important route even when the load applied to the central processing device is large. That is, the important route can always be tested which increases reliability of an operation of the exchange.

Other objects, features and advantages will become more apparent from the following detailed description when read in conjunction with the accompanying drawings.

DETAILED DESCRIPTION OF THE PREFERRED EMBODIMENTS

Figure 1:
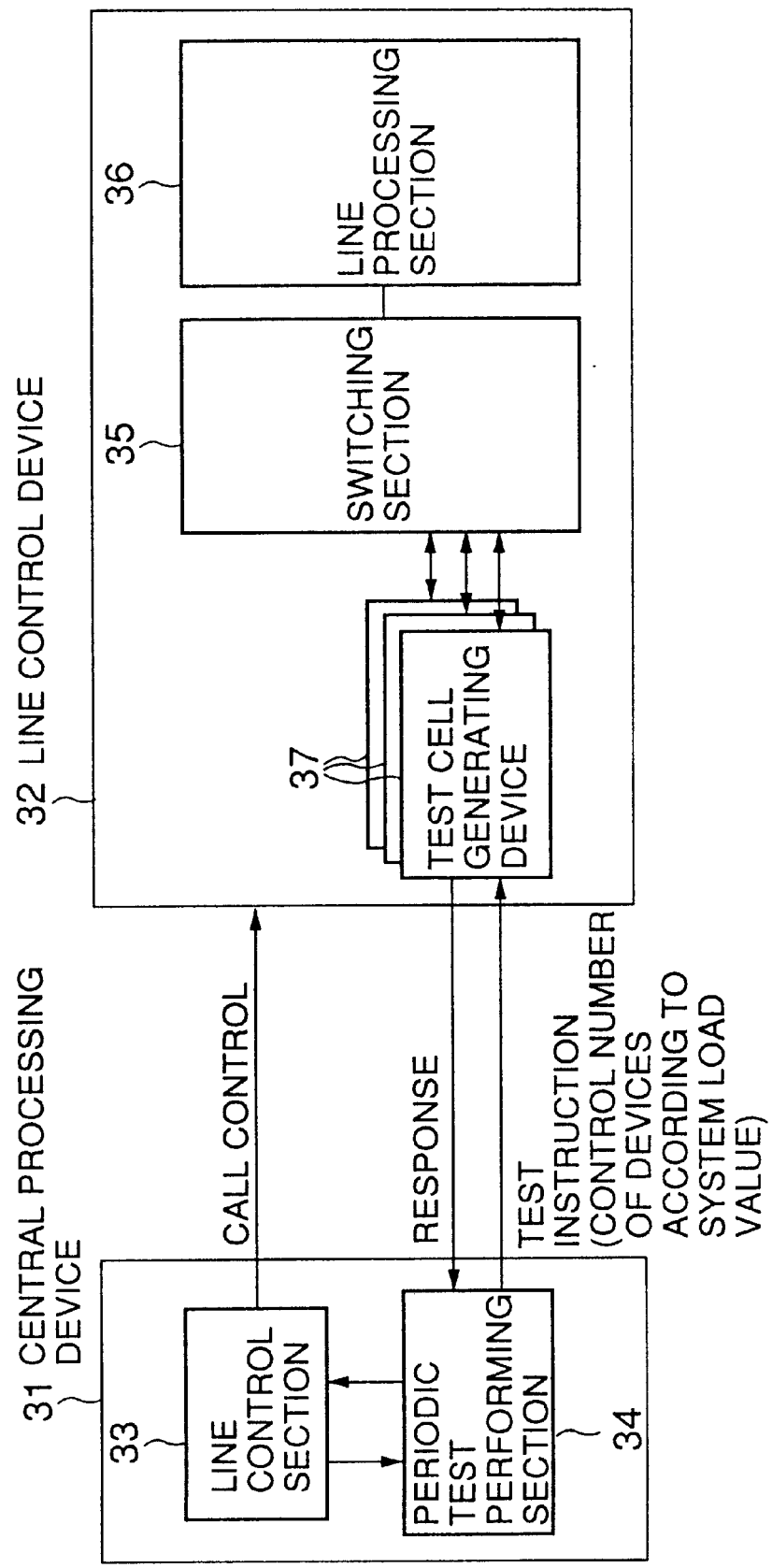
FIG. 1 is a block diagram of an exchange for explaining a principle of the present invention.

FIG. 1 is a block diagram of an exchange for explaining a principle of the present invention. The exchange shown in FIG. 1 comprises a central processing device 31 and a line processing device 32. The central processing device 31 comprises a line control section 33 and a periodic test performing section 34. The line control device comprises a switching section 35, a line processing section 36 and a plurality of test cell generating devices 37. Although a test for the exchange may be performed at an arbitrary time, a description will given below of a periodic test which is performed at a preset time.

The line control section 33 of the central processing device 31 controls the switching section 35 and a line processing section 36 of the line control device 32. Additionally, the line control section measures a load value of the central processing device 31 related to call control and other controls, such as a system load value represented by a rate of use which corresponds to a number of processings per unit time. Further, the line control section 31 measures a load value of the central processing device 31 during a test process in which the test cell generating devices 37 are used.

The periodic test performing section 34 periodically sends an instruction to the test cell generating devices 37 so that test cells are transmitted from the test cell generating devices 37 so as to perform a conductivity test or an intersection test. The test cells transmitted from the test cell generating devices 37 are folded at designated points in the switching section 35 and the line processing section 36. The periodic test performing section 34 calculates a number of test cell generating devices 37 to be activated which can be concurrently activated to perform the test so that the system load value does not exceed a predetermined load limit value.

The periodic test performing section 34 reduces the number of test cell generating devices 37 to be used when the system load value exceeds the predetermined load limit value so as to suppress an increase in the load value of the central processing device 31. Additionally, the periodic test performing section 34 stops the test when the central processing device 31 becomes congested. Further, the periodic test performing section 34 may control the test so that the test is performed for an important route even when a load value of the central processing device 31 is considerably increased.

Figure 2:
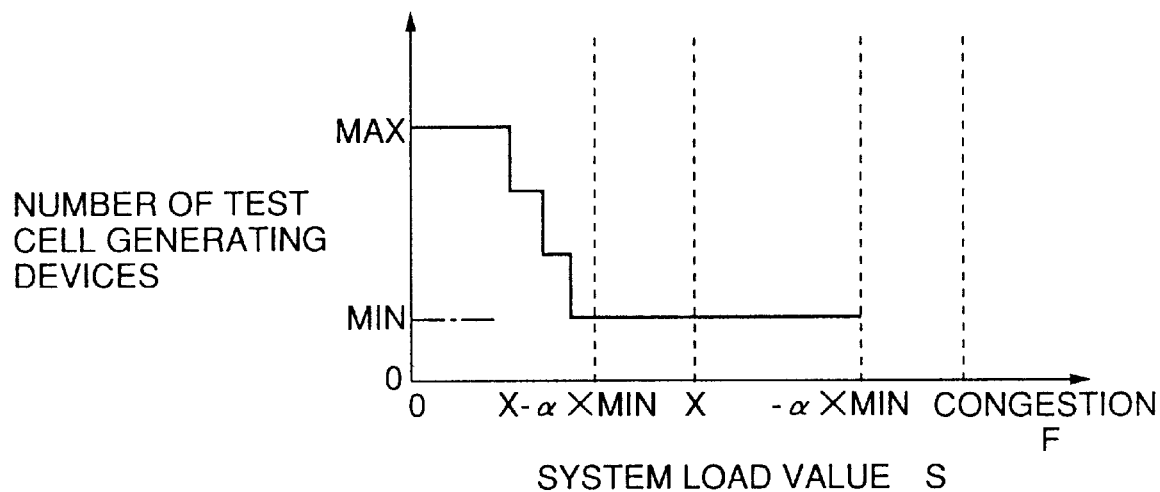
FIG. 2 is a graph for explaining a control of a number of test cell generating devices to be used in an embodiment according to the present invention.

FIG. 2 is a graph for explaining a control of the number of test cell generating devices to be used in an embodiment according to the present invention. In FIG. 2, the vertical axis represents the number of test cell generating devices, and the horizontal axis represents a system load value S. That is, the graph of FIG. 2 represents a relationship between the number of test cell generating devices 37 and the system load value S which is a load value of the central processing device 31 obtained by measuring the number of processings per unit time performed by the central processing device 31 due to call controls and controls for the test.

In this case, when a measured system load value S satisfies the following relationship (1), the number of test cell generating devices 37 to be used is set to TS1 which is calculated by the relationship (2).

$$S \leq X - \alpha \times MIN \quad (1)$$

where X is a system load value at which a control of the periodic test is started; α is a system load value when the test is performed by using a single test cell generating device 37; F is a system load value at a congestion level; MAX is a maximum number of test cell generating devices 37 usable for the periodic test; MIN is a minimum number of test cell generating devices 37 usable for the periodic test.

$$TS1 = (X-S)/\alpha \quad (2)$$

It should be noted that the number TS1 is an integer and an upper limit value of the number TS1 is equal to the maximum number MAX. Additionally, when the measured system load value S satisfies the relationship (3), the number of test cell generating devices 37 to be used for the periodic test is set to TS2 which is equal to the minimum number MIN as indicated by the relationship (4).

$$X - \alpha \times MIN < S \leq F - \alpha \times MIN \quad (3)$$

$$TS2 = MIN \quad (4)$$

Accordingly, the test for the exchange is performed by using a number of test cell generating devices 37 which is between the maximum number MAX and the minimum number MIN of the usable test cell generating devices 37.

On the other hand, if the measured system load value S satisfies the following relationship (5), the periodic test is stopped.

$$F - \alpha \times MIN < S \quad (5)$$

That is, the value of F−axMIN which is less than the system load value F at congestion is regarded as a load value at which the test is stopped. In this case, it is determined, after a predetermined time period W has passed, whether or not the above-mentioned relationship (1) or (3) is satisfied. If the relationship (1) or (3) is satisfied, the periodic test is restarted, and if it is not, the determination is repeated for R times. If the relationship (1) or (3) is not satisfied even after the determination is performed R times, the periodic test is skipped. It should be noted that the system load value F at a level of congestion may be set as the load value at which the test is stopped.

In FIG. 2, the number of test cell generating devices 37 is gradually reduced from the maximum number MAX as the measured system load value S is increased. If the number of test cell generating devices 37 is reduced to a value which satisfies the relationship (3), the number of test cell generating devices 37 is set to be equal to the minimum value MIN and the periodic test is performed. On the other hand, when the measured system load value S exceeds X−α×MIN, the periodic test is stopped. Accordingly, in the periodic test performed by using a plurality of test cell generating devices, a time needed for the test can be reduced by increasing the number of test cell generating devices to be used when the system load value S is small, and an occurrence of congestion in the central processing device can be avoided by decreasing the number of test cell generating devices to be used when the system load value S is large.

Figure 3:
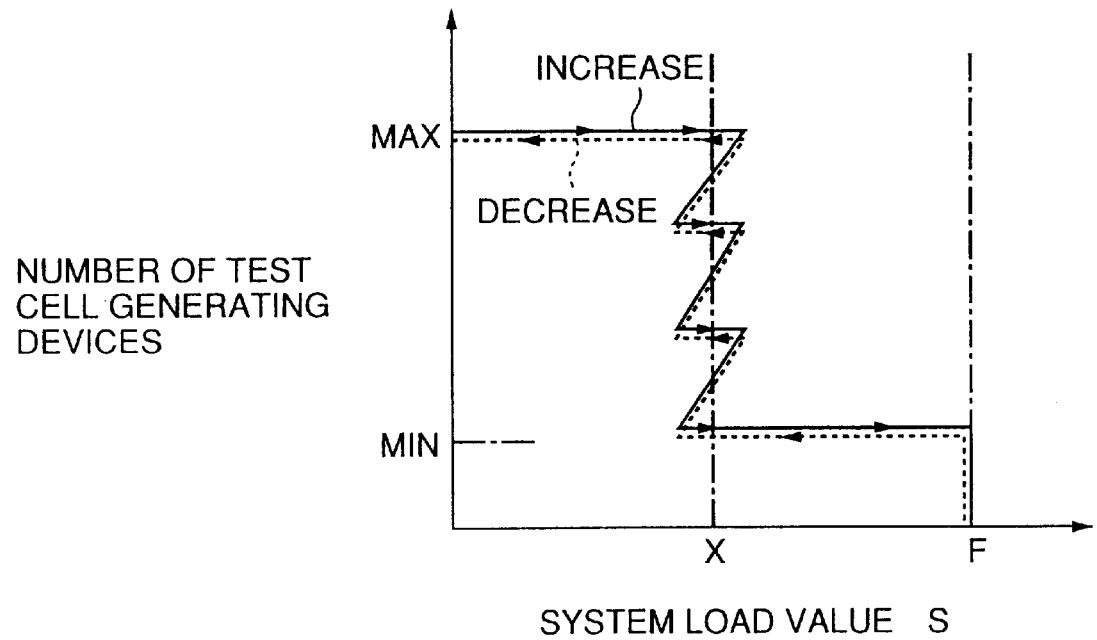
FIG. 3 is a graph for explaining a control of a number of test cell generating devices to be used when a test is continued until a level of congestion is reached.

FIG. 3 is a graph for explaining a control of the number of test cell generating devices to be used when a test is continued until a level of congestion is reached. The number of test cell generating devices to be used in the test for the exchange is determined by setting a control start load value and a test stop load value as control values. Additionally, a call control is continued by avoiding an occurrence of congestion. In this case, when a periodic test control start system load value X is set as the control start load value, the system load value F of the level of congestion is set as the test stop load value, and also the maximum number MAX and the minimum number MIN of the test cell generating devices are set, the test is performed by using the maximum number MAX of the test cell generating devices 37 in a range in which the system load value S does not exceed the periodic test control start system load value X. Accordingly, in this case, the test can be completed within a short time. When the system load value S is increased and if the system load value S exceeds the periodic test control start system load value X, the system load value S is prevented from being increased due to the execution of the periodic test by decreasing the number of test cell generating devices 37.

However, it is possible that the system load value S further increases beyond the periodic test control start system load value X due to an increase in the call controls. In such a case, the number of test cell generating devices to be used is decreased. If the number of test cell generating devices is decreased to the minimum number MIN (for example, one), the test is continued even if the system load value S exceeds the periodic test control start system load value X. Then, when the system load value S exceeds the system load value F of a level of congestion, the test is stopped. That is, since the system load value S exceeds the test stop load value, the test is stopped so that the system load value S does not exceed the congestion level. Accordingly, when the system load value S increases, the number of test cell generating devices 37 to be used when the periodic test is performed changes as indicated by bold solid line arrows in FIG. 3.

When the number of test cell generating devices 37 to be used is set to the minimum number MIN when the periodic test is started, the system load value S is equal to the system load value F of the level of congestion. Thereafter, if the system load value S is decreased, the periodic test is continued with the minimum number MIN until the system load value S is decreased to a value less than the periodic test control start system load value X. Then, when the system load value S is decreased to a value less than the periodic test control start system load value X, the number of test cell generating devices 37 is increased until the number of test cell generating devices 37 reaches the maximum number MAX. After the number of test cell generating devices 37 reaches the maximum number MAX, the maximum number is retained even if the system load value S is further decreased. That is, in this case, the number of test cell generating devices 37 to be used when the periodic test is performed changes as indicated by dashed line arrows in FIG. 3.

Accordingly, the periodic test is continued so that the system load value S does not exceeds the system load value F of the level of congestion either when the system load value S increases or decreases during the periodic test. Additionally, the number of test cell generating devices 37 is controlled so that the system load value S does not exceeds the periodic test control start system load value X.

The number of test cell generating devises 37 to be used is set to the maximum number so as to reduce a time needed for the test.

Figure 4:
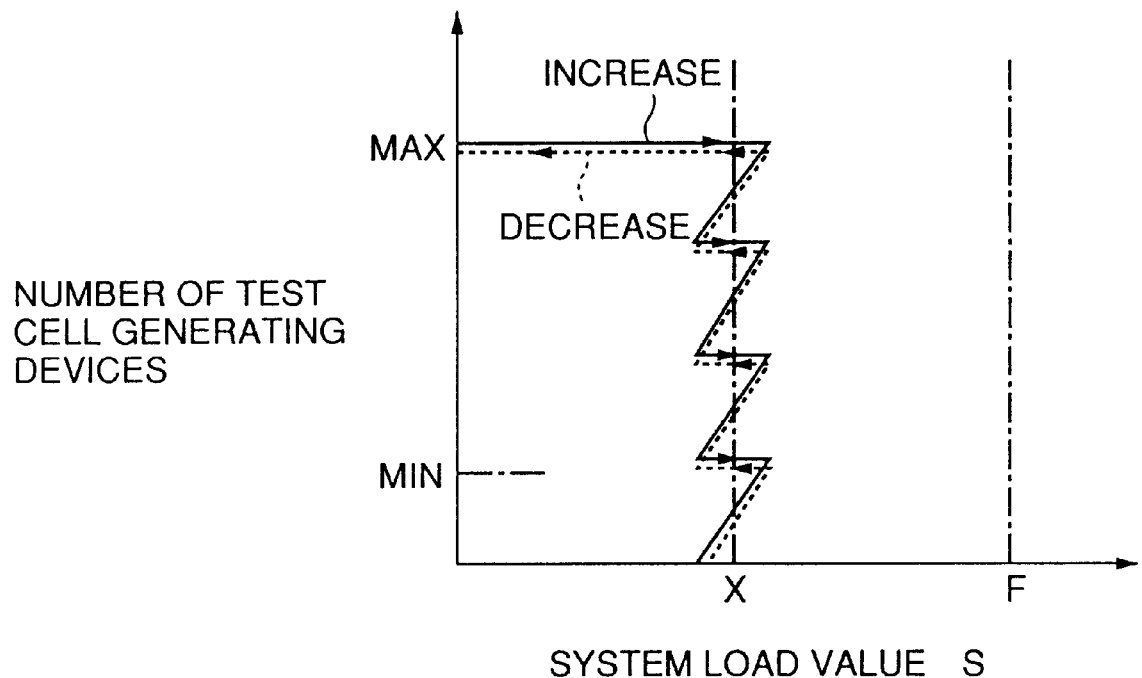
FIG. 4 is a graph for explaining a control of a number of test cell generating devices to be used when a test is stopped before a level of congestion is reached.

FIG. 4 is a graph for explaining a control of a number of test cell generating devices to be used when a test is stopped before a level of congestion is reached. The number of test cell generating devices to be used in the test for the exchange is determined by setting a control start load value and a test stop load value as control values. Additionally, a call control is continued by avoiding an occurrence of congestion. In this case, the control start load value and the test stop load value are set to the same value. It should be noted that F represents a system load value of a level of congestion.

In this case, similar to the above-mentioned case, the periodic test control start system load value X is set as the control start load value. Within a range in which the system load value S does not exceed the periodic test control start system load value X, the test is performed with the number of test cell generating devices 37 being set equal to the maximum number MAX. When the system load value S is increased and if the system load value S exceeds the periodic test control start system load value X, the number of test cell generating devices 37 is decreased.

Thereafter, if the system load value S continues to decrease even if the number of test cell generating devices 37 is decreased to a value less than the minimum value MIN (for example, one), the test is stopped. Accordingly, the number of test cell generating devices 37 to be used when the periodic test is performed changes as indicated by bold solid line arrows in FIG. 4 when the system load value S is increased. On the other hand, when the system load value S is decreased from the periodic test control start system load value X after the test is started, the number of test cell generating devices 37 to be used when the periodic test is performed changes as indicated by dashed line arrows in FIG. 4.

Accordingly, the number of test cell generating devices 37 is controlled so that the system load value S does not exceeds the periodic test control start system load value X either when the system load value S increases or decreases during the periodic test. Additionally, the periodic test is stopped before the system load value S becomes close to the system load value F of the level of congestion so that there is no influence to the call control performed by the central processing device 31. Further, when the system load value S is small, a time needed for the test can be reduced by increasing the number of test cell generating devices 37.

Figure 5:
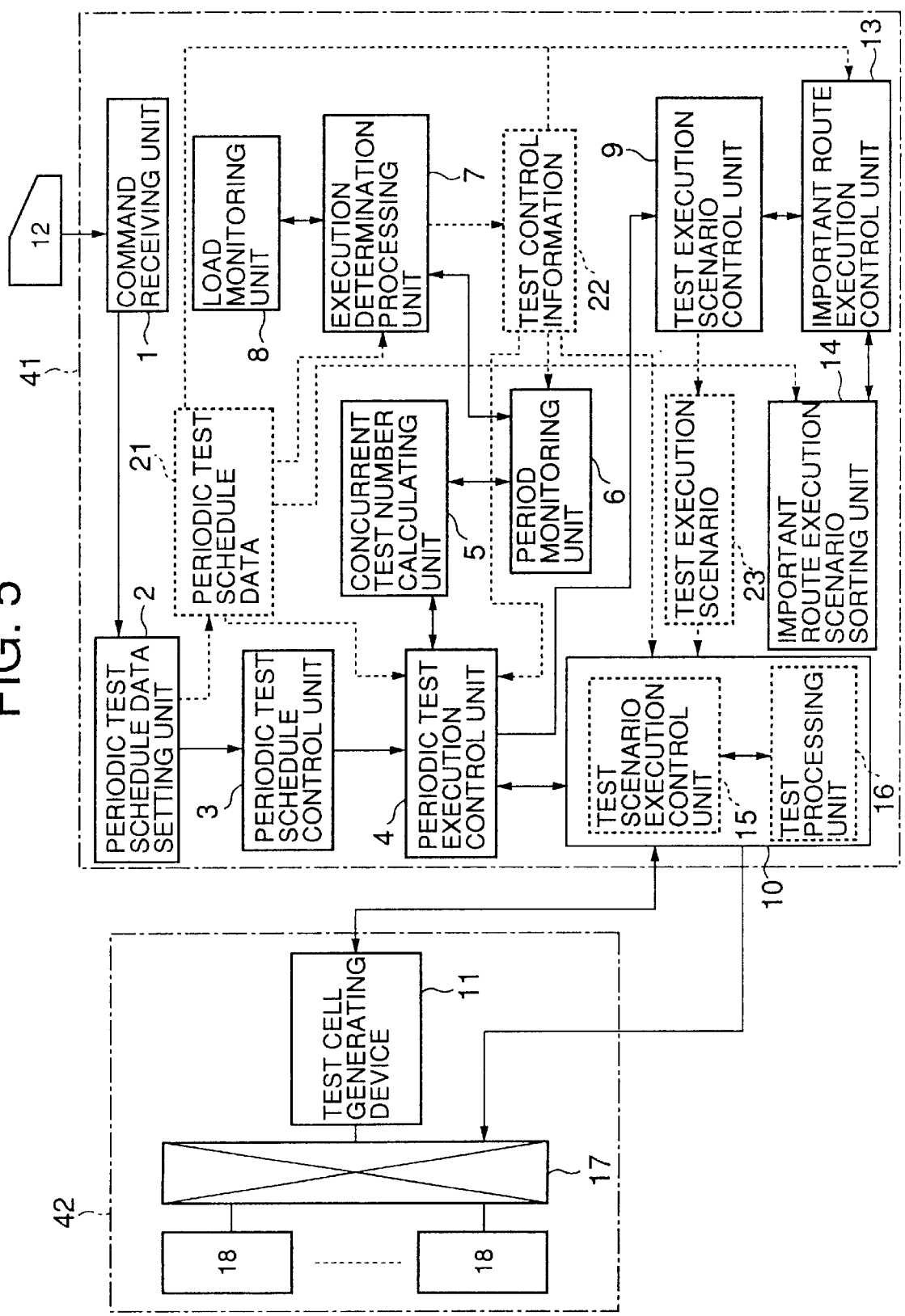
FIG. 5 is a block diagram of an exchange according to the embodiment of the present invention.

FIG. 5 is a block diagram of the exchange according to an embodiment of the present invention. The exchange shown in FIG. 5 comprises a central processing unit (CPU) 41 which corresponds to the central processing device 31 shown in FIG. 1 and a line control device 42 which corresponds to the line control device 32 shown in FIG.1. In FIG. 5, a part corresponding to the line control section 33 shown in FIG. 1 is monitored. Additionally, a test cell generating device 11 corresponds to the test cell generating devices 37 shown in FIG. 1. In FIG. 5, although a plurality of test cell generating devices 11 are provided, only one is indicated for the sake of simplification.

The central processing unit (CPU) 41 comprises, as shown in FIG. 5, a command receiving unit, a periodic test schedule data setting unit 2, a periodic test schedule control unit 3, a periodic test execution control unit 4, a concurrent test number calculating unit 5, a period monitoring unit 6 for a load to a CPU for the periodic test, an execution determination processing unit 7, a load monitoring unit 8, a test execution scenario control unit 9, a test execution processing unit 10, an important route execution control unit 13, an important route scenario sorting unit 14, a test scenario execution processing unit 15 and a test processing unit 16. In FIG. 5, periodic test schedule data 21, test control information 22 and test execution scenario 23 which are indicated by dashed lines are stored in memories (not shown in the FIG. ).

The line control device 42 comprises the test cell generating devices, a switching unit 17 which corresponds to the switching section 35 shown in FIG. 1 and a line processing unit which corresponds to the line processing section 36 shown in FIG. 1.

A maintenance unit inputs a periodic test schedule registration command from a maintenance terminal 12. At that time, the maintenance unit designates a periodic test start time, the periodic test control start system load value X (the control start load value), the periodic test stop system load value (the test stop load value), the maximum number MAX of the usable test cell generating devices 11, the minimum number MIN of the usable test cell generating devices and a waiting time when the periodic test stop start system load value is exceeded. These input commands are transferred from the command receiving unit 1 to the periodic test schedule data processing unit 2, and then registered in the memories (not shown in the FIG.).

The periodic test schedule control unit 3 monitors a start time announced by the periodic test schedule data setting unit 2 so as to activate the periodic test execution control unit 4. The periodic test execution control unit 4 checks conditions for executing the test. For example, the periodic test execution control unit 4 checks a state of the plurality of the test cell generating devices 11 so as to extract the test cell generating devices to be used.

The load monitoring unit 8 obtains a load value represented by a rate of use of the central possessing unit 41 so as to respond to a request of the execution determination processing unit 7. The concurrent test number calculating unit 5 obtains a number of tests which can be concurrently performed when the periodic test execution control unit 4 is activated to perform the test. Thereby, the number of test cell generating devices 11 is determined.

Figure 6:
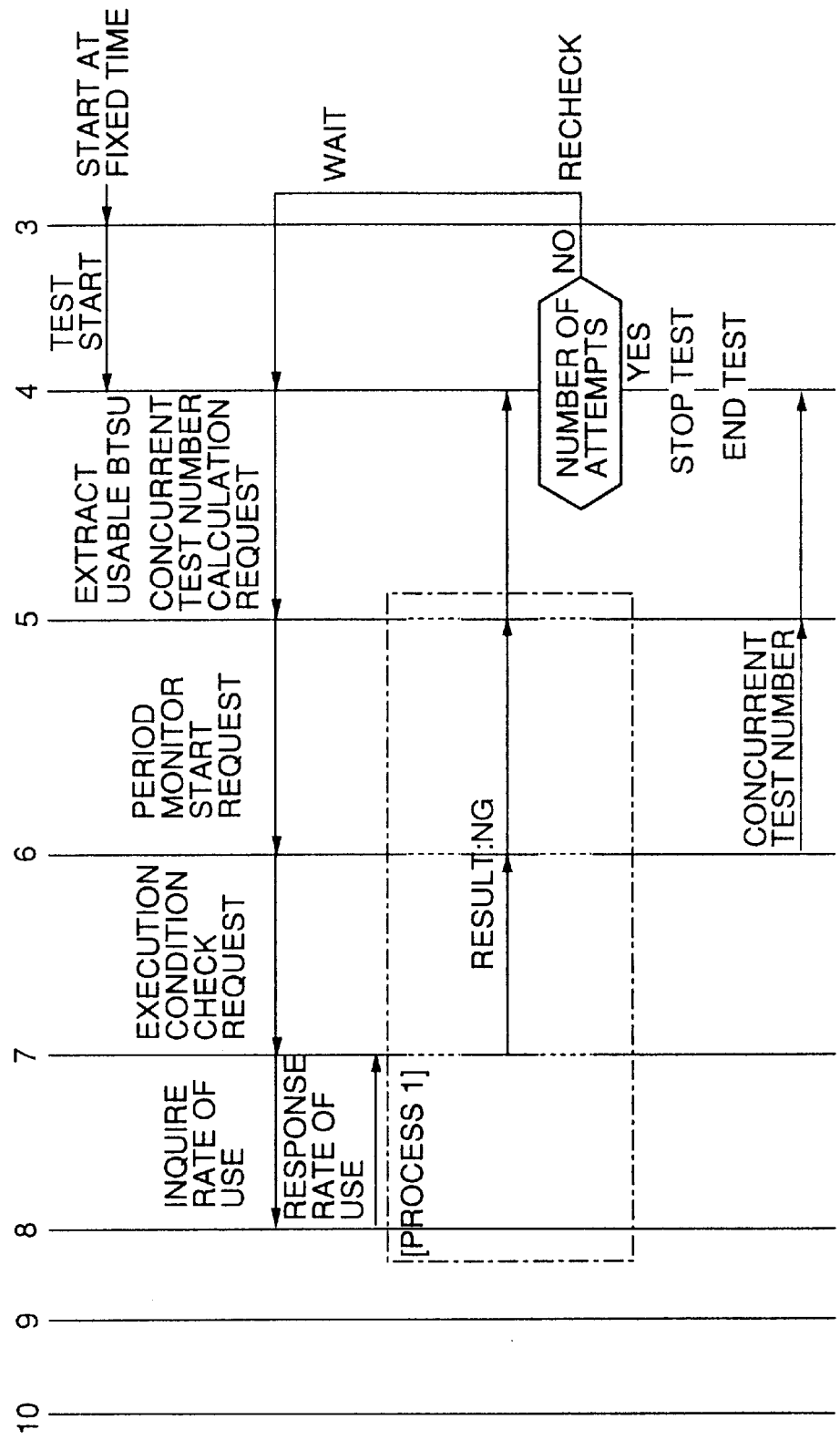
FIG. 6 is a sequence chart for explaining a periodic test execution processing sequence performed in the present embodiment.
Figure 7:
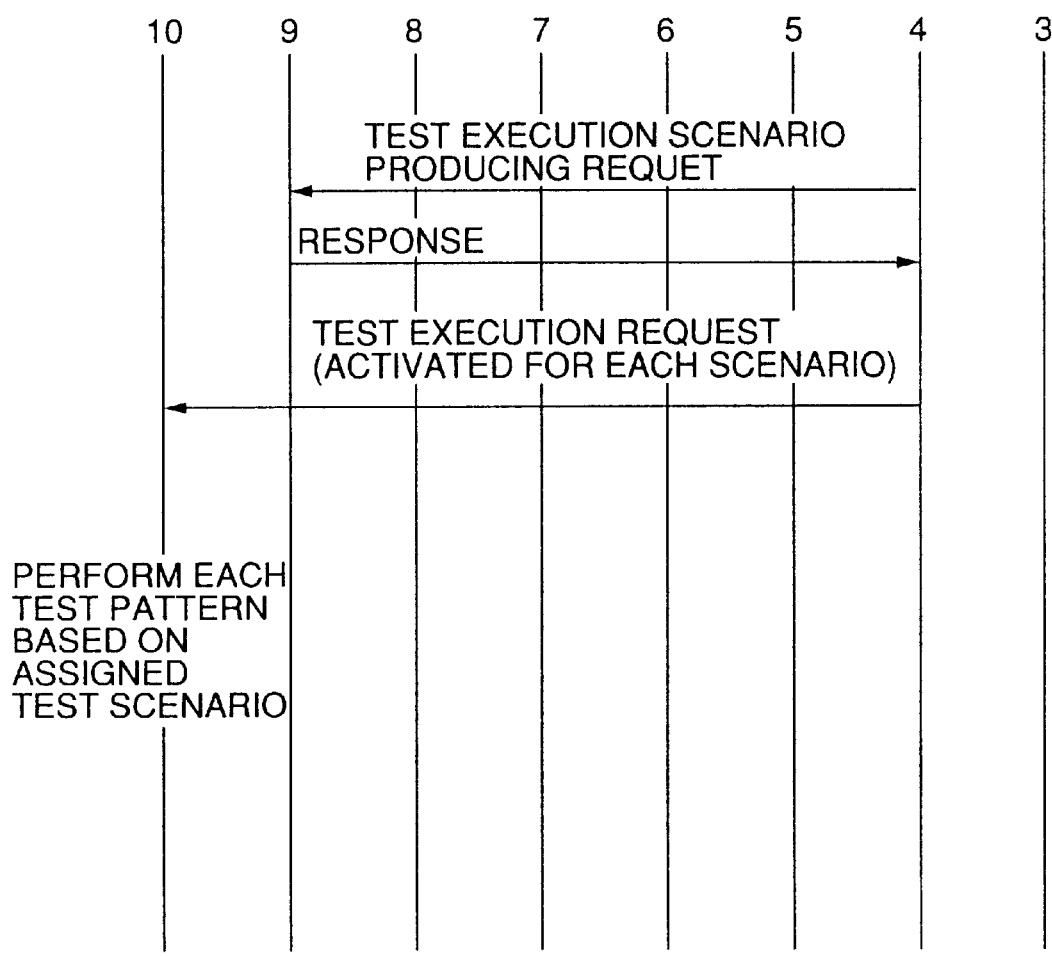
FIG. 7 is a sequence chart for explaining the periodic test execution processing sequence performed in the present embodiment.

FIGS. 6 and 7 are sequence charts for explaining a periodic test execution processing sequence performed in the present embodiment. In FIGS. 6 and 7, numerals 3 to 10 correspond to the periodic test schedule control unit 3, the periodic test execution control unit 4, the concurrent test number calculating unit 5, the period monitoring unit 6, the execution determination processing unit 7, the load monitoring unit 8, the test execution scenario control unit 9 and the test execution processing unit 10 shown in FIG. 5, respectively. A description will now be given, with reference to FIGS. 5 to 7, of the periodic test execution process sequence.

The periodic test schedule control unit 3 monitors the start time, as mentioned above, so as to activate the periodic test execution control unit 4, for example, at 24:00 hours. The periodic test execution control unit 4 checks the condition for executing the test. At this time, the periodic test execution control unit 4 extracts the usable test cell generating units (BTSU) 11, and activates the concurrent test number calculating unit 5 so as to request a calculation of the concurrently performed number of tests. The concurrent test number calculating unit 5 activates the period monitoring unit 6 so as to obtain the number of tests which can be concurrently performed based on a current rate of use of the central processing unit (CPU) 41. The period monitoring unit 6 activates the execution determination processing unit 7 at every constant time during a time when it is activated to a time of completion of each periodic test so as to calculate and control the number of tests to be executed. The execution determination processing unit 7 analyzes response information and registers the result to the test control information 22.

The execution determination processing unit 7 make an inquiry as to a rate of use of the central processing unit 41 to the load monitoring unit 8 so as to obtain a current rate of use (corresponding to system load value). The execution determination processing unit 7 then compares the obtained system load value with the periodic test control start system load value and the periodic test stop start system load value in the periodic schedule data 21 in accordance with a "process 1" (described later) so as to calculate the number of tests which can be concurrently performed (hereinafter referred to as a concurrent execution number). A result of the calculation is announced to the periodic test execution control unit 4.

The periodic test execution control unit 4 make a request to the test execution scenario control unit 9 to produce a test execution scenario by adding the concurrent execution number (refer to FIG. 7). Thus, the test execution scenario control unit 9 produces a test scenario in which periodic test execution routes are divided by the concurrent execution number, and sends the test scenario to the periodic test execution control unit 4. Then, the periodic test execution control unit 4 activates the test execution processing unit 10 for each scenario. The test execution processing unit 10 executes each test pattern based on the assigned test scenario.

In this case, the test cell generating device 11 sends a predetermined number of test cells to the designated test route in accordance with an instruction by the test execution processing unit 10. Then, the test cell generating device 11 extracts the test cells which were folded at folding points (designated in the switching unit 17 or the line processing units 18) in the designated route, and sends a result of comparison performed on the test cells to the test execution processing unit 10 in a manner similar to a folding test.

Figure 8:
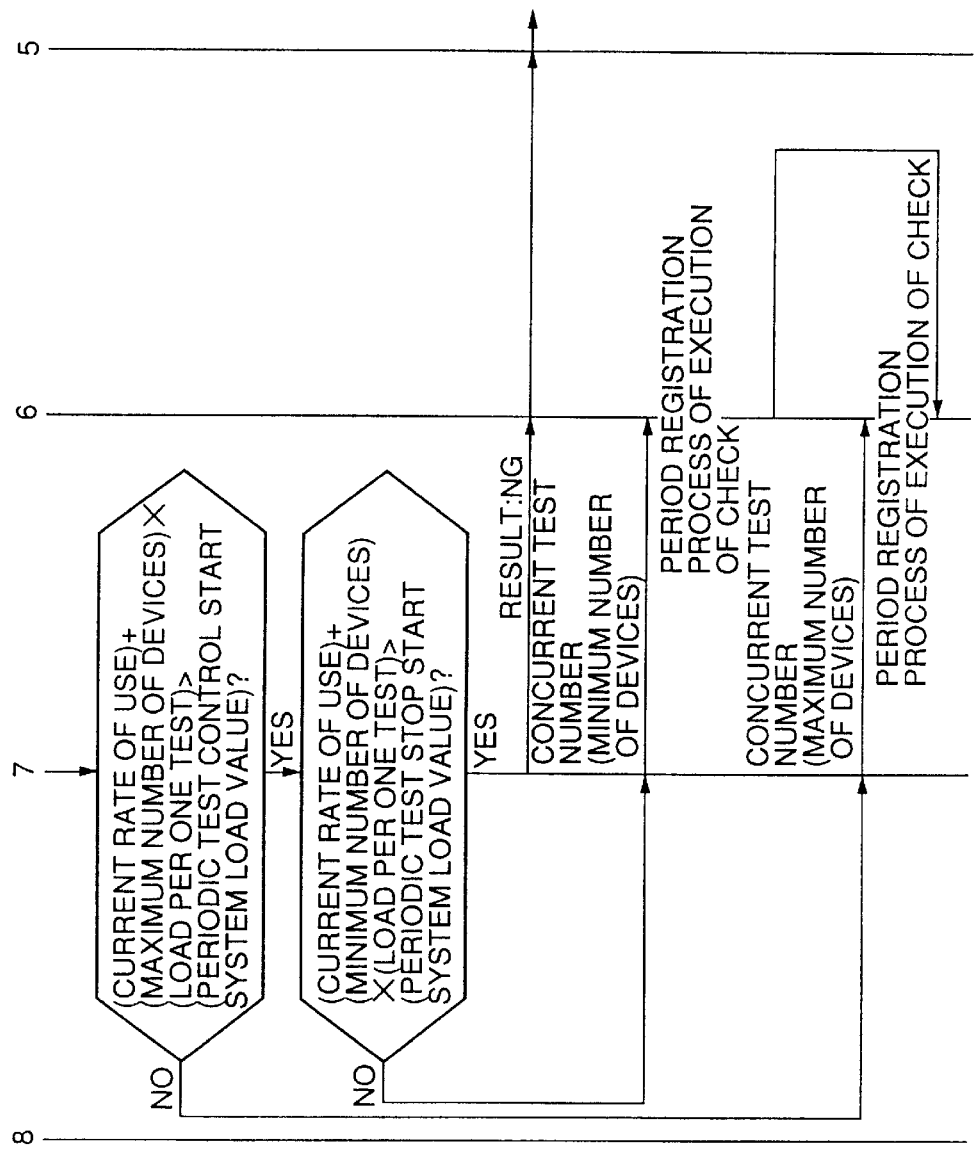
FIG. 8 is a sequence chart for explaining a "process 1" shown in FIG. 6.

FIG. 8 is a sequence chart for explaining the "process 1" shown in FIG. 6. The execution determination processing unit 7 determines whether or not a value of {(current rate of use)+(maximum number of test cell generating devices)×(load per one test)} is greater than the periodic test control start system load value. If it is greater, then the execution determination processing unit 7 determines whether or not a value of {(current rate of use)+(minimum number of test cell generating devices)×(load per one test)} is greater than the periodic test stop start system load value. If it is greater, a result of determination is set to NG, and the result is announced to the period monitoring unit 6. Then, the period monitoring unit 6 announces the result to the concurrent test number calculating unit 5, and sequentially the result is announced to the periodic test execution control unit 4.

It should be noted that a number of attempts is calculated based on a waiting time for a case in which the periodic test stop start system load value is exceeded and a waiting time of the periodic test execution control unit 4 when the test is stopped. The above-mentioned waiting time is designated together with the designation of the periodic test control start system load value and the periodic test stop start system load value. Accordingly, if the periodic test control start system load value and the periodic test stop start load value are not set, the number of attempts is set to zero.

The periodic test execution control unit 4 determines whether or not the number of attempts for stopping the test in the periodic test schedule data 21 is zero. If the number of attempts is not zero, another attempt is performed after the waiting time has passed so as to send a concurrent test number calculation request to the concurrent test number calculating unit 5. On the other hand, if the number of attempts is zero, the test is interrupted and is ended.

Additionally, if {(current rate of use)+(minimum number of test cell generating devices)×(load per one test)} is not greater than the periodic test stop start system load value, the periodic test execution control unit 4 announces the concurrent test number corresponding to the minimum number of test cell generating devices to the period monitoring unit 6. The period monitoring unit 6 registers a period for checking execution of the test, and announces the concurrent test number to the concurrent test number calculating unit 5. Then, the concurrent test number calculating unit 5 announces the concurrent test number corresponding to the minimum number of test cell generating devices to the periodic test execution control unit 4.

Additionally, if {(current rate of use)+(maximum number of test cell generating devices)×(load per one test)} is not greater than the periodic test control start system load value, the periodic test execution control unit 4 announces the concurrent test number corresponding to the maximum number of test cell generating devices to the period monitoring unit 6. The period monitoring unit 6 registers a period for checking execution of the test, and announces the concurrent test number to the concurrent test number calculating unit 5. Then, the concurrent test number calculating unit 5 announces the concurrent test number corresponding to the maximum number of the test cell generating devices to the periodic test execution control unit 4.

Figure 9:
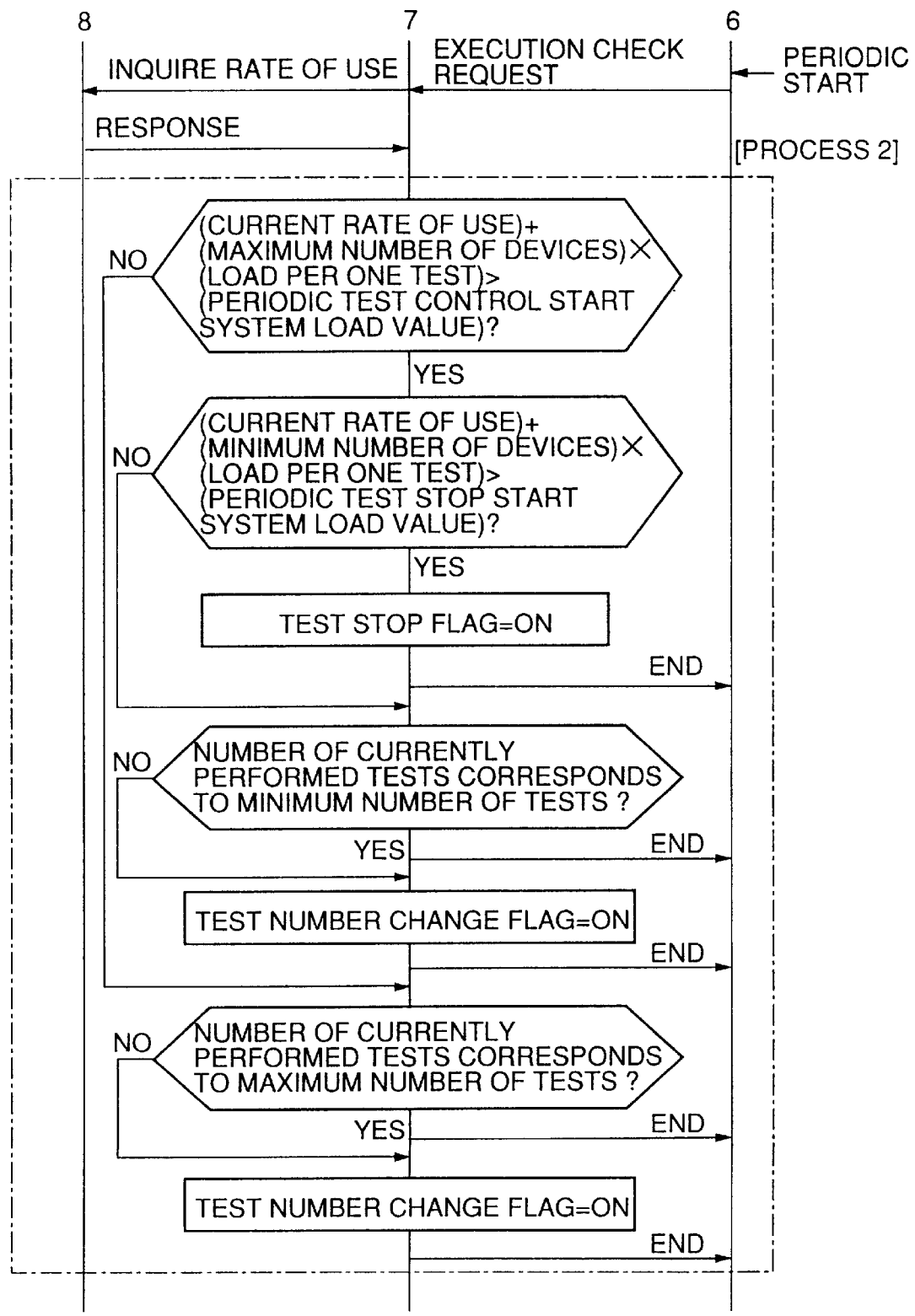
FIG. 9 is a sequence chart for explaining an execution of a test according to the present embodiment.

FIG. 9 is a sequence chart for explaining an execution of the test according to the present embodiment. In FIG. 9, numerals 6 to 8 correspond to the period monitoring unit 6, the execution determination processing unit 7 and the load monitoring unit 8, respectively. When the periodic test is performed, the period monitoring unit 6 is activated at a constant period. Then, the period monitoring unit 6 sends an execution check request to the execution determination processing unit 7. The execution determination processing unit 7 then transmits an inquiry as to a rate of use (system load value) to the load monitoring unit 8, and receive the rate of use as a response.

Thereafter, the execution determination processing unit 7 performs a "process 2". In the "process 2", it is determined whether or not {(current rate of use)+(maximum number of test cell generating devices)×(load per one test)} is greater than the periodic test control start system load value. If it is not greater, it is then determined whether or not the number of tests currently performed is the maximum number of tests. If it is the maximum number of tests, an end of the test is announced to the period monitoring unit 6. If it is not the maximum number of tests, a test number changing flag in the test control information 22 is turned on, and the end of the test is announced to the period monitoring unit 6.

On the other hand, if it is determined that {(current rate of use)+(maximum number of test cell generating devices)× (load per one test)} is greater than the periodic test control start system load value, it is then determined whether or not {(current rate of use)+(minimum number of test cell generating devices)×(load per one test)} is greater than the periodic test stop start system load value. If it is not greater, it is then determined whether or not the number of tests currently performed is the minimum number of tests. If it is the minimum number of tests, an end of the test is announced to the period monitoring unit 6. If it is not the minimum number of tests, a test number changing flag in the test control information 22 is turned on, and the end of the test is announced to the period monitoring unit 6.

If {(current rate of use)+(minimum number of test cell generating devices)×(load per one test)} is greater than the periodic test stop start system load value, a test stop flag in the test control information 22 is turned on, and the end of the test is announced to the period monitoring unit 6. The periodic test is interrupted by recognizing the test stop flag.

Figure 10:
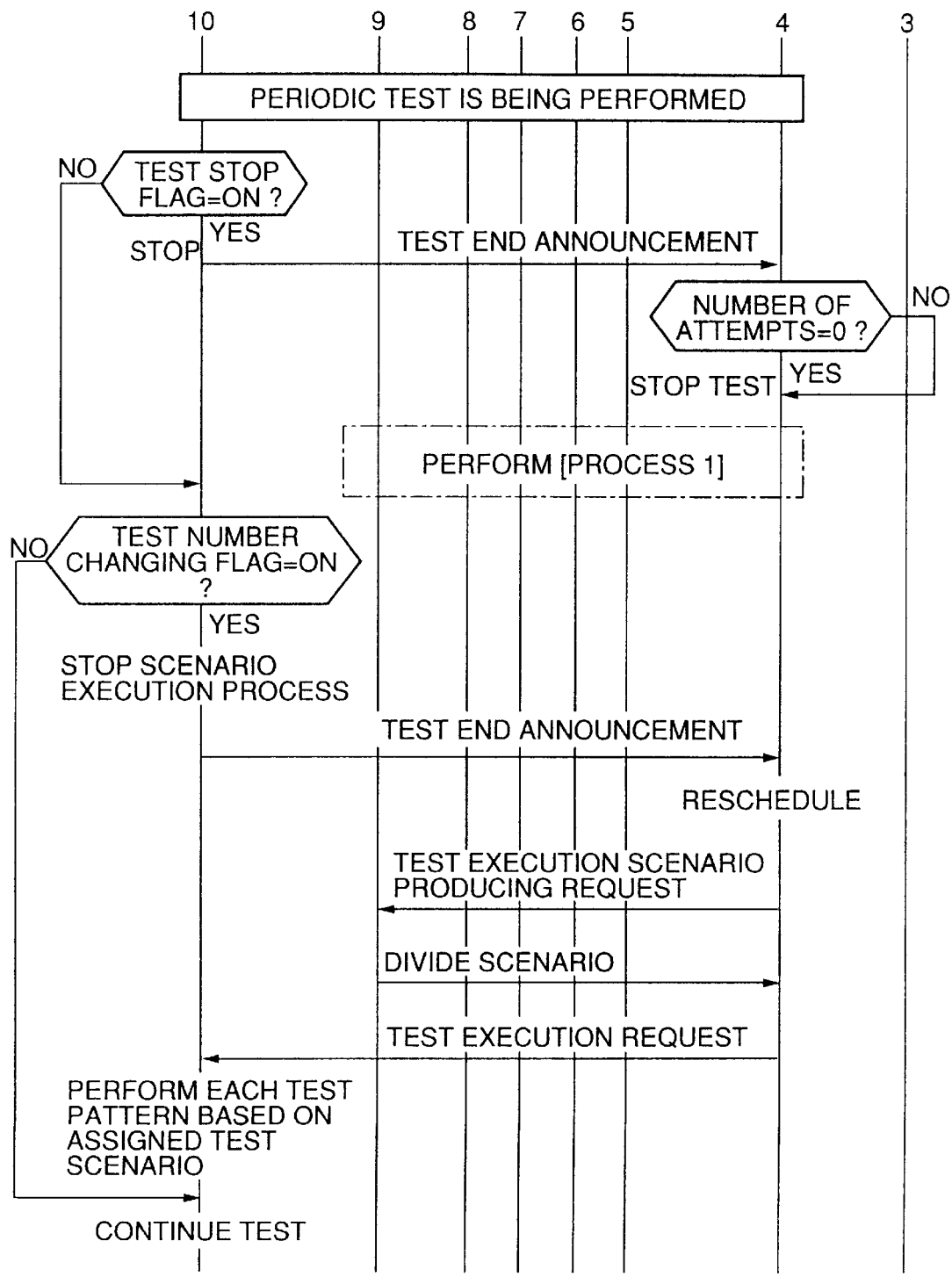
FIG. 10 is a sequence chart for explaining a control process sequence according to the present embodiment.

FIG. 10 is a sequence chart for explaining a control process sequence according to the present embodiment. When the periodic test is performed, the test execution processing unit 10 determines whether or not the test stop flag in the test control information is turned on. If it is on, the test being performed is interrupted, and an end of the test is announced to the periodic test execution control unit 4. The periodic test execution control unit 4 determines whether or not the number of attempts is zero by the announcement of the end of the test. If it is determined that the number of attempts is zero, the test is interrupted. If it is determined that the number of attempts is not zero, the "process 1" shown in FIG. 8 is performed. The "process 1" is repeated for the number of attempts with appropriate timing, i.e., at an appropriate time.

In the determination for the test stop flag in the test control information 22 performed by the test execution processing unit 10, if the test stop flag is not on, it is then determined whether or not the test number changing flag is turned on. If it is not on, the test is continued with the currently set concurrent test number. That is, the test is continued by using the number of test cell generating devices corresponding to the concurrent test number. On the other hand, if the test stop flag is turned on, a scenario execution process is interrupted immediately after the test being performed is completed, and then the end of the test if announced to the periodic test execution control unit 4. The periodic test execution control unit 4 performs a rescheduling based on the test number in the test control information 22, and requests the test execution scenario control unit 9 to produce a test execution scenario based on the concurrent test number.

The test execution scenario control unit 9 extracts only non-checked routes from the test execution scenario 23 so as to divide the scenario again, and announces the scenario to the periodic test execution control unit 4. The periodic test execution control unit 4 sends a test execution request to the test execution processing unit 10 so that the test execution processing unit 10 is activated for each scenario unit. Additionally, the periodic test execution control unit 4 performs each test pattern based on the assigned test scenario.

Figure 11:
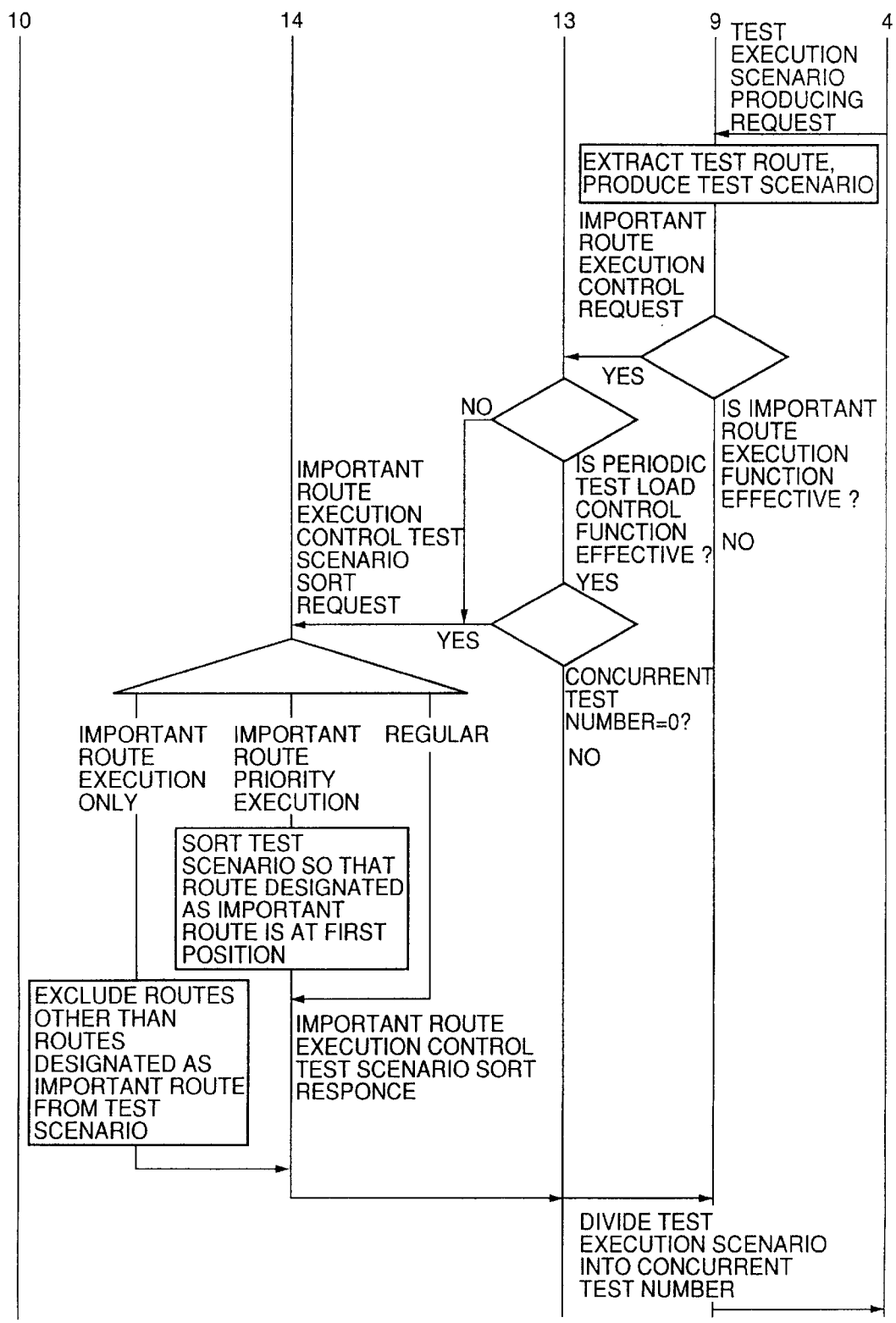
FIG. 11 is a sequence chart for explaining a process for an important route according to the present embodiment.

FIG. 11 is a sequence chart for explaining a process for an important route according to the present embodiment. In FIG. 11, numerals 4, 9, 10, 13 and 14 correspond to the periodic test execution control unit 4, the test execution scenario control unit 9, the test execution processing unit 10, the important route execution control unit 13 and the important route scenario sorting unit 14 shown in FIG. 5, respectively. When the periodic test for important routes is performed, a designation of an important route test execution control mode and a designation of an important route are included in the periodic test schedule registration command when it is input through the maintenance terminal 12 (refer to FIG. 5).

The important route execution test control mode can be set by a selection of one of a "regular control" (regular mode), an "important route priority execution" (priority mode) and an "important route execution only" (exclusive mode). The important route designation is set by designating the route which the maintenance considers important. These commands are transferred to the periodic test schedule data setting unit 2 via the command receiving unit 1 (refer to FIG. 5), and are registered as the periodic test schedule data 21.

The periodic test execution control unit 4 obtains a concurrent test number and, thereafter, sends to the test execution scenario control unit 9 a request for producing the test execution scenario provided with the concurrent test number. Thereby, the test execution scenario control unit 9 extracts the test routes and produces the test scenario. Then the test execution scenario control unit 9 determines whether or not an important route execution control function is effective in the periodic test schedule data 21. That is, it is determined whether or not an important route execution control mode and the important route in the periodic test schedule data 21 are designated. If the function is effective, the test execution scenario control unit sends to the important route execution control unit 13 a request for controlling an execution of a test with respect to the important route.

The important route execution control unit 13 determines whether or not a periodic test load control function is effective. That is, it is determined whether or not a periodic test load control start system load value in the periodic test schedule data 21 is designated. If the function is effective, it is determined whether or not the concurrent test number in the test control information 22 is zero. If it is zero, or if the function is not effective, the important route execution control unit 13 sends to the important route execution scenario sorting unit 14 a request for sorting the scenario for executing the test with respect to the important routes. That is, even if the periodic test load control function is not effective, the important route execution scenario sorting unit 14 is activated unless the concurrent test number is zero.

The important route scenario sorting unit 14 performs a branching process in accordance with the important route execution control mode so as to send a result of the branching process to the important route execution control unit 13. If the "important route execution only" is selected, the response is obtained by excluding the route other than that designated as an important route from the test scenario. If the "important route priority execution" is selected, the response is obtained by sorting the test scenario so that the one in which the important route is designated is placed in a first position. If the "regular control" is selected, the test scenario is obtained as a response without changes. The response thus obtained is sent to the important route execution control unit 13.

The response is transferred from the important route execution control unit 13 to the test execution scenario control unit 9. Thereby, the test execution scenario control unit 9 divides the periodic test execution routes into the concurrent test number based on a result obtained from the concurrent test number calculating unit 5 when the periodic test is being started up or based on the concurrent test number in the test control information 22 when the periodic test is being performed, and a result is announced to the periodic test execution control unit 4. Accordingly, even if the system load value exceeds the periodic test system load control start load value, the designated important routes can be tested with a priority by setting the important route execution control mode to the "important route priority execution". Alternatively, only the designated important routes are tested by setting the important route execution control mode to the "important route execution only".

The present invention is not limited to the specifically disclosed embodiments, and variations and modifications may be made without departing from the scope of the present invention.

What is claimed is:

1. A method for controlling a test performed on a broad band ISDN exchange including a central processing device, the test being performed by using test cells transmitted from a plurality of test cell generating devices provided in the exchange, the method comprising the steps of:

measuring a load applied to said central processing device;

calculating a number of said test cell generating devices to be used so that the measured load is maintained below a previously set limit value; and performing the test for said exchange by concurrently using the calculated number of said test cell generating devices.

2. The method as claimed in claim 1, further comprising the steps of:

setting a control start load value and a test stop load value as said limit value;

setting the number of said test cell generating devices to be used to a maximum number within a range in which the load applied to said central processing device is maintained below said control start load value;

setting the number of said test cell generating devices being used to a minimum number when the load applied to said central processing device exceeds said control start load value; and continuing the test with the number of said test cell generating devices being set to the minimum number within a range in which the load applied to said central processing device is maintained below said test stop load value.

3. The method as claimed in claim 2, further comprising the steps of:

stopping the test when the load applied to said central processing device exceeds said test stop load value;

determining whether the load applied to said central processing device has been decreased when a predetermined time has passed after the test was stopped; and resuming the test when it is determined by the determining step that the load applied to said central processing device has been decreased.

4. The method as claimed in claim 1, further including the steps of:

setting a test stop load value as said limit value;

stopping the test when the load applied to said central processing device exceeds said test stop load value;

determining whether the load applied to said central processing device has been decreased when a predetermined time has passed after the test was stopped; and resuming the test when it is determined by the determining step that the load applied to said central processing device has been decreased.

5. The method as claimed in claim 1, further comprising the steps of:

setting a control start load value as said limit value;

setting the number of said test cell generating devices to be used to a maximum number;

decreasing the number of said test cell generating devices being used from the maximum number so as to maintain the load applied to said central processing device to be below said control start load value; and temporarily stopping the test when the load applied to said central processing device exceeds said control start load value when the number of said test cell generating devices being used is a minimum number.

6. The method as claimed in claim 1, further comprising the steps of:

registering a maximum number and a minimum number of said test cell generating devices used for the test on said exchange;

setting a control start load value and a test stop load value as said limit value; and setting the number of said test cell generating devices to be used to a number within a range between said maximum number and said minimum number by comparing the measured load with both said control start load value and said test stop load value.

7. The method as claimed in claim 1, further comprising the steps of:

setting at least one route of a plurality of routes formable within said exchange as an important route;

setting an important route test execution control mode to said exchange in which one of a priority mode and an exclusive mode is selectable;

performing the test by giving priority to said important route when said priority mode is selected and the load applied to said central processing device exceeds said control start load value; and performing the test only for said important route when said exclusive mode is selected and the load applied to said central processing device exceeds control start load value.

8. The method as claimed in claim 7, further comprising the steps of:

setting a minimum number of said test cell generating devices to be used;

decreasing the number of said test cell generating devices when the load applied to said central processing device exceeds said limit value;

performing the test by giving priority to said important route when said priority mode is selected and the load applied to said central processing device exceeds said control start load value when the number of said test cell generating devices is set to said minimum number; and performing the test only for said important route when said exclusive mode is selected and the load applied to said central processing device exceeds control start load value when the number of said test cell generating devices is set to said minimum number.

* * * * *